(12) United States Patent
Norita et al.

(10) Patent No.: US 8,997,916 B2
(45) Date of Patent: Apr. 7, 2015

(54) POWER UNIT FOR VEHICLE AND FOUR-WHEELED VEHICLE

(71) Applicant: Honda Motor Co., Ltd., Tokyo (JP)

(72) Inventors: Kazuhiro Norita, Wako (JP); Toshimasa Mitsubori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/224,584

(22) Filed: Mar. 25, 2014

(65) Prior Publication Data

US 2014/0296031 A1    Oct. 2, 2014

(30) Foreign Application Priority Data

Mar. 28, 2013    (JP) ................. 2013-070146

(51) Int. Cl.
  *B60W 10/02*    (2006.01)
  *B60W 10/11*    (2012.01)
  *B60K 17/02*    (2006.01)
  *B60K 23/02*    (2006.01)

(52) U.S. Cl.
  CPC .............. *B60W 10/02* (2013.01); *B60W 10/11* (2013.01); *B60W 10/023* (2013.01)

(58) Field of Classification Search
  CPC ... B60W 10/023; B60W 10/02; B60W 10/00; B60W 10/06; B60W 10/10; B60W 10/11
  USPC ................... 180/336, 315; 477/79, 81, 70, 77
  See application file for complete search history.

(56) References Cited

U.S. PATENT DOCUMENTS

| 8,210,063 B2 * | 7/2012 | Tsukada et al. ................... 74/33 |
| 2007/0144857 A1 * | 6/2007 | Tsukada et al. ............... 192/48.8 |
| 2008/0078265 A1 * | 4/2008 | Shiozaki et al. ........... 74/473.12 |
| 2009/0088938 A1 * | 4/2009 | Usukura ........................ 701/55 |

FOREIGN PATENT DOCUMENTS

JP    2003-185014 A    7/2003

* cited by examiner

*Primary Examiner* — Keith Frisby
(74) *Attorney, Agent, or Firm* — Squire Patton Boggs (US) LLP

(57) ABSTRACT

A clutch actuator and a speed change actuator are disposed so as to be adjacent to each other on one side of an engine main body along the axis of a crankshaft. The clutch actuator is provided with a manual clutch operating part capable of being manually operated. The speed change actuator is provided with a manual speed change operating part capable of being manually operated.

20 Claims, 12 Drawing Sheets

POWER UNIT FOR VEHICLE AND FOUR-WHEELED VEHICLE

BACKGROUND

1. Field

Certain embodiments of the present invention relate to a power unit for a vehicle. The power unit may include a clutch actuator for switching between connection and disconnection of a hydraulic clutch provided midway in a power transmission system between a crankshaft of an internal combustion engine and a driving wheel, and a speed change actuator for switching the speed change stage of a transmission provided midway in the power transmission system. Other embodiments of the present invention may include a four-wheeled vehicle mounted with such a power unit for a vehicle.

2. Description of the Related Art

A power unit for a vehicle which power unit includes a clutch actuator and a speed change actuator is known in Japanese Patent Laid-Open No. 2003-185014 (Patent Document 1) and the like.

SUMMARY

In the power unit disclosed in the above Patent Document 1, the speed change actuator is provided with a manual speed change operating part capable of being manually operated at a time of an emergency such as a failure of the actuator or battery exhaustion. However, the clutch actuator is not provided with such an operating part capable of being manually operated. It is desirable that the clutch actuator also be capable of being manually operated at a time of an emergency. In that case, there is a problem in operability when the manual operating parts of the speed change actuator and the clutch actuator are located at positions distant from each other.

Certain embodiments of the present invention have been made in view of such a situation. It is an object of certain embodiments of the present invention to provide a power unit for a vehicle and a four-wheeled vehicle in which the operability of a speed change actuator and a clutch actuator can be improved while each of the speed change actuator and the clutch actuator is made manually operable at a time of an emergency.

In order to achieve the object, according to certain embodiments of the present invention, there is provided a power unit for a vehicle. The power unit includes a clutch actuator for switching between connection and disconnection of a hydraulic clutch provided midway in a power transmission system between a crankshaft of an internal combustion engine and a driving wheel, and a speed change actuator for switching a speed change stage of a transmission provided midway in the power transmission system. The clutch actuator and the speed change actuator are disposed so as to be adjacent to each other on one side of an engine main body along an axis of the crankshaft. The clutch actuator is provided with a manual clutch operating part capable of being manually operated. The speed change actuator is provided with a manual speed change operating part capable of being manually operated.

According to other embodiments, the manual speed change operating part of the speed change actuator including a reduction gear mechanism is provided so as to allow a tool to be hooked onto a gear shaft forming part of the reduction gear mechanism.

According to other embodiments, the manual clutch operating part of the clutch actuator including a manual switching valve is an operating piston forming part of the manual switching valve and oriented to a side of the speed change actuator.

According to other embodiments, a space to which the manual speed change operating part is faced is formed between the clutch actuator and the speed change actuator so as to allow operation of the tool necessary to change the speed change stage of the transmission by one stage.

Further, according to other embodiments, at least part of the engine main body is disposed below the rear-row occupant footrest floor, so that the manual speed change operating part and the manual clutch operating part can be manually operated by opening part of the rear-row occupant footrest floor.

According to certain embodiments of the present invention, the clutch actuator and the speed change actuator are made manually operable by the manual clutch operating part and the manual speed change operating part. Thus, each of the speed change actuator and the clutch actuator can be manually operated at a time of an emergency. In addition, the clutch actuator and the speed change actuator are disposed so as to be adjacent to each other on one side of the engine main body along the axis of the crankshaft. Therefore the manual clutch operating part and the manual speed change operating part are also disposed in proximity to each other. This makes it possible to successively perform clutch connection switching necessary for travelling and the switching of the speed change stage. Therefore operability can be improved.

In addition, according to other embodiments, the manual speed change operating part is provided so as to allow the tool to be hooked onto the gear shaft forming part of the reduction gear mechanism. Thus, the manual speed change operating part is formed by changing the shape of the gear shaft, and the number of parts can be reduced by sharing the functions of parts, which sharing eliminates a need to add new parts.

According to other embodiments, the manual clutch operating part is the operating piston forming part of the manual switching valve and oriented to the side of the speed change actuator. Thus, the operability of the manual speed change operating part and the manual clutch operating part can be further improved.

According to other embodiments, the tool necessary to change the speed change stage of the transmission by one stage can be operated in the space formed between the clutch actuator and the speed change actuator. Thus, the speed change stage can be changed by one stage without a need for special operation of the manual speed change operating part, while the space between the clutch actuator and the speed change actuator is prevented from becoming larger than necessary.

Further, according to other embodiments, at least part of the engine main body is disposed below the rear-row occupant footrest floor provided to the four-wheeled vehicle. Thus, a lower center of gravity can be achieved. In addition, the manual speed change operating part and the manual clutch operating part can be manually operated by opening part of the rear-row occupant footrest floor. Therefore usability at a time of an emergency can be improved.

DETAILED DESCRIPTION

Certain embodiments of the present invention will be described with reference to the accompanying FIGS. 1 to 12. In the following description, the terms "front," "rear," "left," "right," "up," and "down" refer to directions viewed from an occupant riding in a four-wheeled vehicle.

Figure 1:
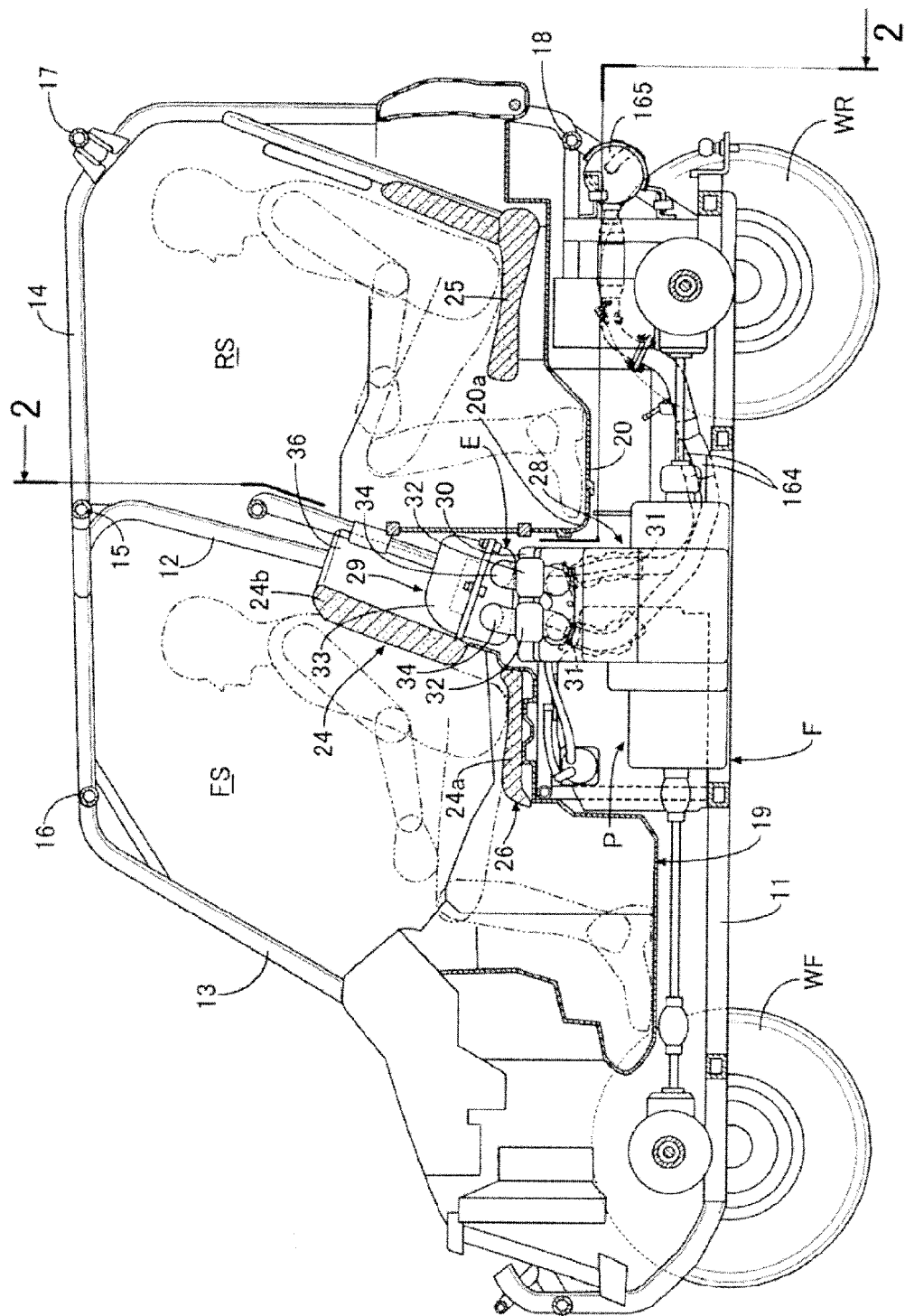
FIG. 1 is a longitudinal sectional side view of an off-road travelling four-wheeled vehicle.
Figure 2:
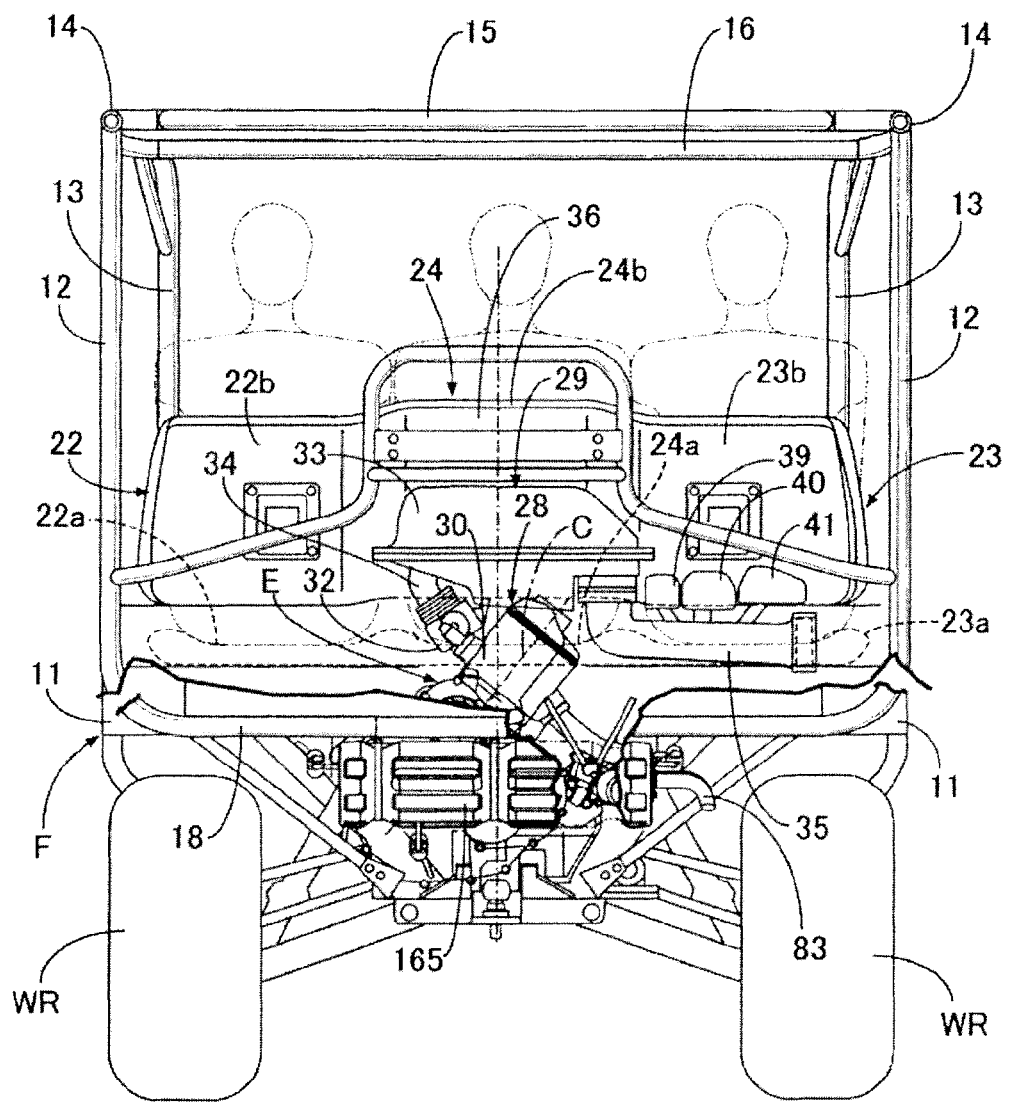
FIG. 2 is a view taken in the direction of arrows along a line 2-2 of FIG. 1.

First, in FIG. 1 and FIG. 2, a pair of left and right front wheels WF is suspended from a front portion of a vehicle body frame F of an off-road travelling four-wheeled vehicle, and a pair of left and right rear wheels WR is suspended from a rear portion of the vehicle body frame F.

The vehicle body frame F includes a pair of left and right lower frames 11 extending in a forward-rearward direction. The vehicle body frame F also includes a pair of left and right center upright frames 12 rising upward from intermediate portions in the forward-rearward direction of the lower frames 11. The vehicle body frame F further includes a pair of left and right front side frames 13 extending frontward from upper ends of the center upright frames 12, extending in a frontward and downward direction from middle portions thereof, and connected to front portions of the lower frames 11. The vehicle body frame F also includes a pair of left and right rear side frames 14 extending rearward from the upper ends of the center upright frames 12, extending in a downward direction from middle portions thereof, and connected to rear portions of the lower frames 11. The vehicle body frame F further includes a center cross member 15 for coupling the upper end portions of the pair of left and right center upright frames 12 to each other. The vehicle body frame F also includes a front cross member 16 for coupling intermediate bent portions of the pair of left and right front side frames 13 to each other. The vehicle body frame F further includes an upper rear cross member 17 for coupling intermediate bent portions of the pair of left and right rear side frames 14 to each other. The vehicle body frame F also includes a lower rear cross member 18 for coupling lower portions of the pair of left and right rear side frames 14 to each other.

The pair of left and right center upright frames 12 and the pair of left and right front side frames 13 constitute the contour of a front riding space FS for a driver and a passenger. A footrest floor 19 for the front-row occupants, which footrest floor 19 is disposed in front of the center upright frames 12, is supported by the front portion of the vehicle body frame F. In addition, the pair of left and right center upright frames 12 and the pair of left and right rear side frames 14 constitute the contour of a rear riding space RS for passengers. A footrest floor 20 for the rear-row occupants, which footrest floor 20 is disposed in the rear of the center upright frames 12, is supported by the rear portion of the vehicle body frame F.

A driver's seat 22 and a passenger seat 23, which passenger seat 23 is disposed on one of a left side and a right side (right side in the present embodiment) of the driver's seat 22, are disposed in the front riding space FS for the driver and the passenger so as to be separated from each other in a vehicle width direction. The driver's seat 22 and the passenger seat 23 are coupled to each other via an intermediate coupling portion 24 functioning as a second passenger seat.

The driver's seat 22 and the passenger seat 23 respectively include bottom portions 22a and 23a and back portions 22b and 23b rising upward from rear portions of the bottom portions 22a and 23a. In addition, the intermediate coupling portion 24 includes a back portion 24b displaced frontward with respect to the back portions 22b and 23b and a bottom portion 24a disposed between the bottom portions 22a and 23a of the driver's seat 22 and the passenger seat 23. The driver's seat 22, the passenger seat 23, and the intermediate coupling portion 24 are integrated as a bench seat 26 long in the vehicle width direction. The bottom portions 22a, 23a, and 24a and the back portions 22b, 23b, and 24b are thus formed so as to be integrally continuous with each other. A pair of left and right passenger seats 25 is provided in the rear riding space RS for passengers.

A two-cylinder internal combustion engine E for exerting power for rotation-driving the pair of left and right front wheels WF as driving wheels and the pair of left and right rear wheels WR as driving wheels is mounted on the vehicle body frame F in such a manner as to be disposed in an intermediate portion in the forward-rearward direction of the vehicle. An engine main body 28 of the internal combustion engine E is mounted on the vehicle body frame F with a cylinder axis C of the engine main body 28 inclined to the side of the passenger seat 23 in the vehicle width direction. At least part of the engine main body 28 is disposed below the rear-row occupant footrest floor 20. In certain embodiments, large part of the engine main body 28 is disposed below an intermediate portion in a longitudinal direction of the bench seat 26, that is, the intermediate coupling portion 24. A rear portion of the engine main body 28 is disposed below the rear-row occupant footrest floor 20.

An inlet system 29 of the internal combustion engine E includes throttle bodies 32 connected to inlet ports 31 provided for respective cylinders in a left side portion of a cylinder head 30 of the engine main body 28. The inlet system 29 also includes an air cleaner 33 disposed between the driver's seat 22 and the passenger seat 23 as viewed in a plan view. The inlet system 29 further includes a pair of connecting tubes 34 for providing connection between the throttle bodies 32 and the air cleaner 33. The inset system 29 also includes a single inlet duct 35 for guiding air to the air cleaner 33.

The air cleaner 33 is formed so as to be oblong in the vehicle width direction, and is disposed between the back portions 22b and 23b of the driver's seat 22 and the passenger seat 23. In addition, the back portion 24b of the intermediate coupling portion 24 provided between the driver's seat 22 and the passenger seat 23 is integrally continuous with the back portions 22b and 23b of the driver's seat 22 and the passenger seat 23, and is displaced frontward with respect to the back portions 22b and 23b. The back portions 22b, 23b, and 24b of the driver's seat 22, the passenger seat 23, and the intermediate coupling portion 24 thus form a recessed portion 36 recessed to the front side as viewed in a plan view. The air cleaner 33 is disposed in the recessed portion 36.

A downstream end of the inlet duct 35 extending to a right side portion of the vehicle body along the back portion 23b of the passenger seat 23 is connected to a right side portion of the air cleaner 33. Resonators 39, 40, and 41 are connected to a plurality of positions of the inlet duct 35.

Figure 3:
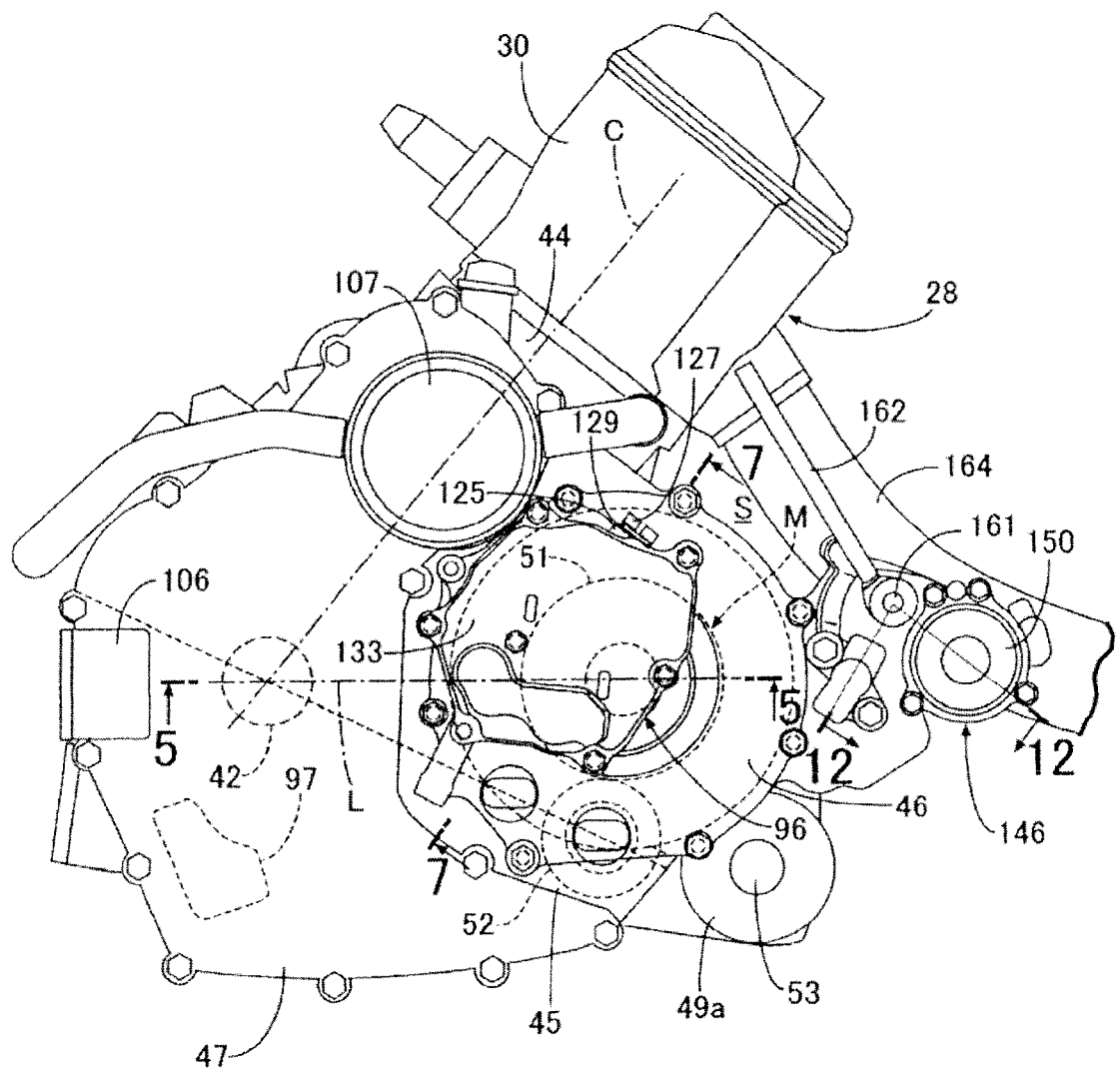
FIG. 3 is a rear view of a power unit.
Figure 4:
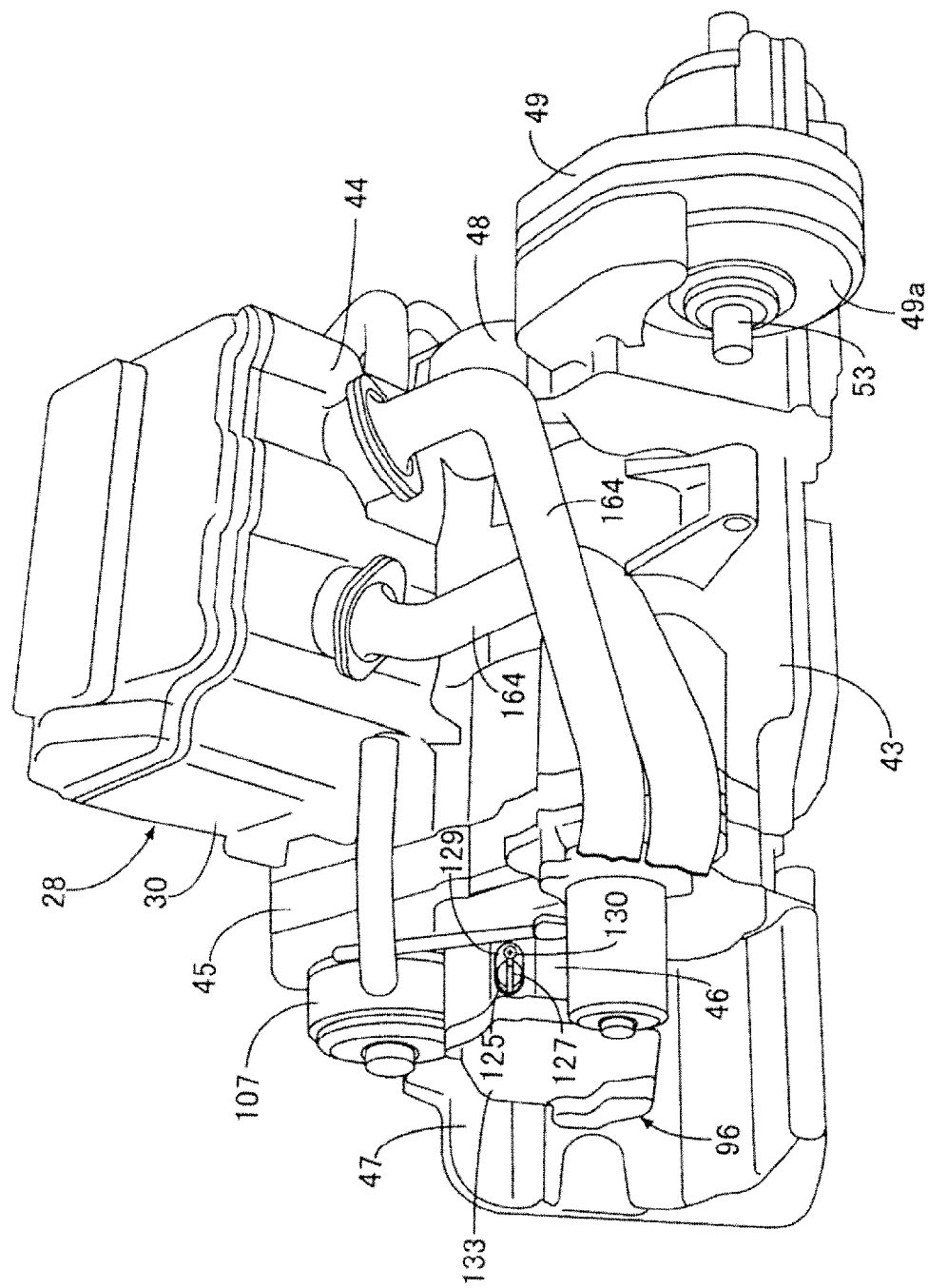
FIG. 4 is a perspective view of the power unit as viewed from the right rear.

Referring also to FIG. 3 and FIG. 4, the engine main body 28 includes a crankcase 43 rotatably supporting a crankshaft 42 extending in the forward-rearward direction of the vehicle. The engine main body 28 also includes a cylinder block 44 having the inclined cylinder axis C and coupled to the crankcase 43. The cylinder head 30 is coupled to an upper portion of the cylinder block 44.

In addition, a spacer plate 45 forming part of the engine main body 28 is coupled to the back of the crankcase 43. A clutch cover 46 covering a first hydraulic clutch 61 and a second hydraulic clutch 62 and an oil storage tank 47 are coupled to the crankcase 43 via the spacer plate 45 in such a manner as to project rearward from the crankcase 43. In addition, as shown in FIG. 4, a generator cover 48 housing a generator coupled coaxially to the crankshaft 42 and a reduction mechanism cover 49 are coupled to an opposite side of the crankcase 43 from the oil storage tank 47 with respect to the axis of the crankshaft 42, that is, a front side of the crankcase 43, in such a manner as to project frontward from the crankcase 43.

As shown in FIG. 3, a transmission M provided midway in a power transmission system between the crankshaft 42 and the front wheels WF and the rear wheels WR as driving wheels is housed in the crankcase 43 so as to form a power unit P together with the internal combustion engine E.

The transmission M is a gear transmission including, on an upper side and a lower side, a driving gear group 51 constituted of a plurality of driving gears and a driven gear group 52 constituted of a plurality of driven gears meshed with the driving gears. In certain embodiments, the driving gear group 51 is disposed above the driven gear group 52.

Power output from the gear transmission M is transmitted to an output shaft 53 via a reduction mechanism housed in the reduction mechanism cover 49. The output shaft 53 extending in the forward-rearward direction so as to have an axis parallel with the crankshaft 42 is rotatably supported by a bulging portion 49a, which is integrally provided to the reduction mechanism cover 49 so as to bulge to a right side of a lower portion of the crankcase 43, such that the output shaft 53 is disposed below the driven gear group 52.

Figure 5:
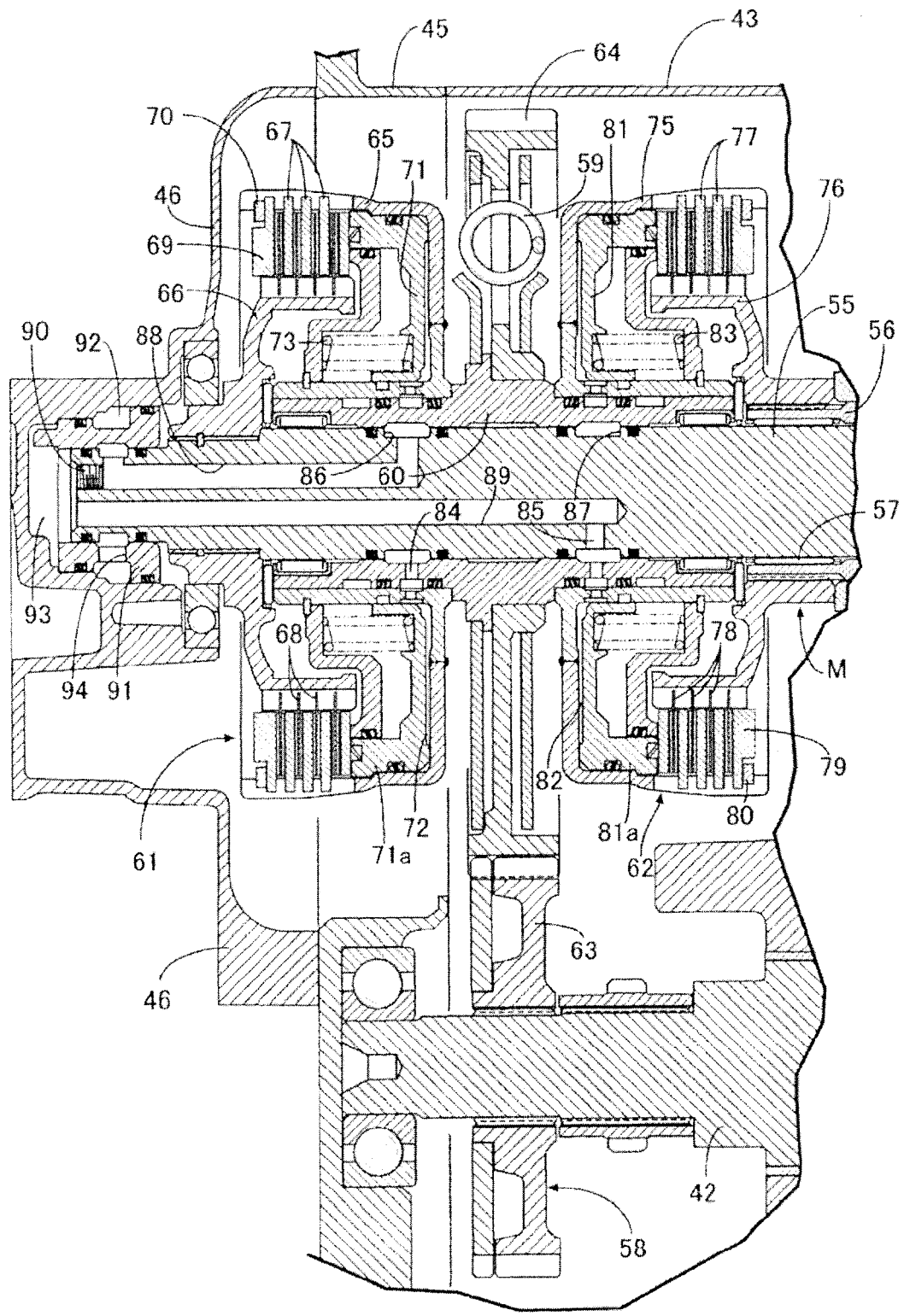
FIG. 5 is a sectional view taken along a line 5-5 of FIG. 3 with a clutch actuator and an oil storage tank omitted.

In FIG. 5, each driving gear of the driving gear group 51 in the transmission M is rotatable about the axis of a first main shaft 55 and a second main shaft 56 that are coaxially disposed so as to have an axis parallel with the crankshaft 42. The axis of the first main shaft 55 and the second main shaft 56, that is, the axis of rotation of the driving gear group 51 is disposed at a same height as the axis of the crankshaft 42.

The first main shaft 55 is rotatably supported by the crankcase 43 and the clutch cover 46 so as to support driving gears for odd-numbered speed change stages in the driving gear group 51. The second main shaft 56 supporting driving gears for even-numbered speed change stages in the driving gear group 51 is formed in the shape of a cylinder coaxially surrounding the first main shaft 55. A needle bearing 57 is interposed between the first main shaft 55 and the second main shaft 56.

Rotating power from the crankshaft 42 is transmitted to the first main shaft 55 via a primary reduction gear 58, a damper spring 59, a transmission cylindrical shaft 60, and the first hydraulic clutch 61. The rotating power from the crankshaft 42 is transmitted to the second main shaft 56 via the primary reduction gear 58, the damper spring 59, the transmission cylindrical shaft 60, and the second hydraulic clutch 62.

The transmission cylindrical shaft 60 adjacent to the second main shaft 56 in an axial direction is mounted on the first main shaft 55 so as to be rotatable relative to the first main shaft 55 at a fixed axial position. The first hydraulic clutch 61 is provided on the first main shaft 55 so as to be able to switch between connection and disconnection of power between the transmission cylindrical shaft 60 and the first main shaft 55. The second hydraulic clutch 62 is provided on the transmission cylindrical shaft 60 and the second main shaft 56 so as to be able to switch between connection and disconnection of power between the transmission cylindrical shaft 60 and the second main shaft 56.

The primary reduction gear 58 includes a primary driving gear 63 rotating together with the crankshaft 42 and a primary driven gear 64 disposed coaxially with the first main shaft 55 and the second main shaft 56 so as to be meshed with the primary driving gear 63. The primary driven gear 64 is coupled to the transmission cylindrical shaft 60 via the damper spring 59.

The first hydraulic clutch 61 includes a first clutch outer 65 disposed further outside than the primary reduction gear 58 in the axial direction, formed in the shape of a bowl opened on an opposite side from the primary reduction gear 58, and coupled to the transmission cylindrical shaft 60 so as to be non-rotatable relative to the transmission cylindrical shaft 60. The first hydraulic clutch 61 also includes a first clutch inner 66 coupled to the first main shaft 55 so as to be non-rotatable relative to the first main shaft 55. The first hydraulic clutch 61 further includes a plurality of first driving friction plates 67 engaged with the first clutch outer 65 so as to be movable in the axial direction relative to the first clutch outer 65. The first hydraulic clutch 61 also includes a plurality of first driven friction plates 68 engaged with the first clutch inner 66 so as to be movable in the axial direction relative to the first clutch inner 66 while arranged alternately with the first driving friction plates 67. The first hydraulic clutch 61 further includes a ring-shaped first pressure receiving plate 69 opposed to an outermost friction plate of the plurality of first driving friction plates 67 and the plurality of first driven friction plates 68 arranged alternately with each other. The first hydraulic clutch 61 also includes a first retaining ring 70 mounted in the first clutch outer 65 so as to be engageable with the first pressure receiving plate 69 from an opposite side from the first driving friction plates 67 and the first driven friction plates 68. The first hydraulic clutch 61 further includes a first piston 71 having a pressing portion 71a as an outer circumferential portion, the first driving friction plates 67 and the first driven friction plates 68 being sandwiched between the pressing portion 71a and the first pressure receiving plate 69, the first piston 71 being liquid-tightly and slidably fitted in the first clutch outer 65, and a first hydraulic chamber 72 being formed between the first piston 71 and the first clutch outer 65. The first hydraulic clutch 61 also includes a first clutch spring 73 for biasing the first piston 71 in a direction of reducing the volume of the first hydraulic chamber 72.

Such a first hydraulic clutch 61 is in a clutch off state in which power transmission is interrupted when no liquid pressure acts on the first hydraulic chamber 72. When a liquid pressure acts on the first hydraulic chamber 72, the first hydraulic clutch 61 is in a clutch on state in which the rotating power transmitted from the crankshaft 42 to the first clutch outer 65 via the primary reduction gear 58, the damper spring 59, and the transmission cylindrical shaft 60 is transmitted to the first main shaft 55.

The second hydraulic clutch 62 is disposed further inside than the first hydraulic clutch 61 in the axial direction such that the primary reduction gear 58 is sandwiched between the first hydraulic clutch 61 and the second hydraulic clutch 62. The second hydraulic clutch 62 includes a second clutch outer 75 formed in the shape of a bowl opened on an opposite side from the first clutch outer 65, and coupled to the transmission cylindrical shaft 60 so as to be non-rotatable relative to the transmission cylindrical shaft 60. The second hydraulic clutch 62 also includes a second clutch inner 76 coupled to the second main shaft 56 so as to be non-rotatable relative to the second main shaft 56. The second hydraulic clutch 62 further includes a plurality of second driving friction plates 77 engaged with the second clutch outer 75 so as to be movable in the axial direction relative to the second clutch outer 75. The second hydraulic clutch 62 also includes a plurality of second driven friction plates 78 engaged with the second clutch inner 76 so as to be movable in the axial direction relative to the second clutch inner 76 while arranged alternately with the second driving friction plates 77. The second hydraulic clutch 62 further includes a ring-shaped second pressure receiving plate 79 opposed to an outermost friction plate of the plurality of second driving friction plates 77 and the plurality of second driven friction plates 78 arranged alternately with each other. The second hydraulic clutch 62 also includes a second retaining ring 80 mounted in the second clutch outer 75 so as to be engageable with the second pressure receiving plate 79 from an opposite side from the second driving friction plates 77 and the second driven friction plates 78. The second hydraulic clutch 62 further includes a second piston 81 having a pressing portion 81a as an outer circumferential portion, the second driving friction plates 77 and the second driven friction plates 78 being sandwiched between the pressing portion 81a and the second pressure receiving plate 79, the second piston 81 being liquid-tightly and slidably fitted in the second clutch outer 75, and a second hydraulic chamber 82 being formed between the second piston 81 and the second clutch outer 75. The second hydraulic clutch 62 also includes a second clutch spring 83 for biasing the second piston 81 in a direction of reducing the volume of the second hydraulic chamber 82.

Such a second hydraulic clutch 62 is in a clutch off state in which power transmission is interrupted when no liquid pressure acts on the second hydraulic chamber 82. When a liquid pressure acts on the second hydraulic chamber 82, the second hydraulic clutch 62 is in a clutch on state in which the rotating power transmitted from the crankshaft 42 to the second clutch outer 75 via the primary reduction gear 58, the damper spring 59, and the transmission cylindrical shaft 60 is transmitted to the second main shaft 56.

The first clutch outer 65 of the first hydraulic clutch 61 and the transmission cylindrical shaft 60 are provided with a first oil passage 84 communicating with the first hydraulic chamber 72. The outer circumference of the first main shaft 55 is provided with a first annular recessed portion 86 communicating with the first oil passage 84. The second clutch outer 75 of the second hydraulic clutch 62, and the transmission cylindrical shaft 60 are provided with a second oil passage 85 communicating with the second hydraulic chamber 82. The outer circumference of the first main shaft 55 is provided with a second annular recessed portion 87 communicating with the second oil passage 85.

A first axial oil passage 88 and a second axial oil passage 89 parallel with each other are provided in the first main shaft 55 so as to have a closed inner end and extend in the axial direction. The first axial oil passage 88 communicates with the first hydraulic chamber 72 via the first annular recessed portion 86 and the first oil passage 84. The second axial oil passage 89 communicates with the second hydraulic chamber 82 via the second annular recessed portion 87 and the second oil passage 85. In addition, an outer end opening of the first axial oil passage 88 is closed by a stopper member 90, and an outer end of the second axial oil passage 89 remains opened.

In addition, the first main shaft 55 is liquid-tightly fitted into a tube member 91 fitted and fixed to the clutch cover 46. A communicating passage 94 for connecting the first axial oil passage 88 to an annular first oil chamber 92 formed between the outer circumference of the tube member 91 and the clutch cover 46 is provided in the tube member 91. In addition, a second oil chamber 93 communicating with the second axial oil passage 89 is formed between the first main shaft 55 and the tube member 91 and the clutch cover 46.

Figure 6:
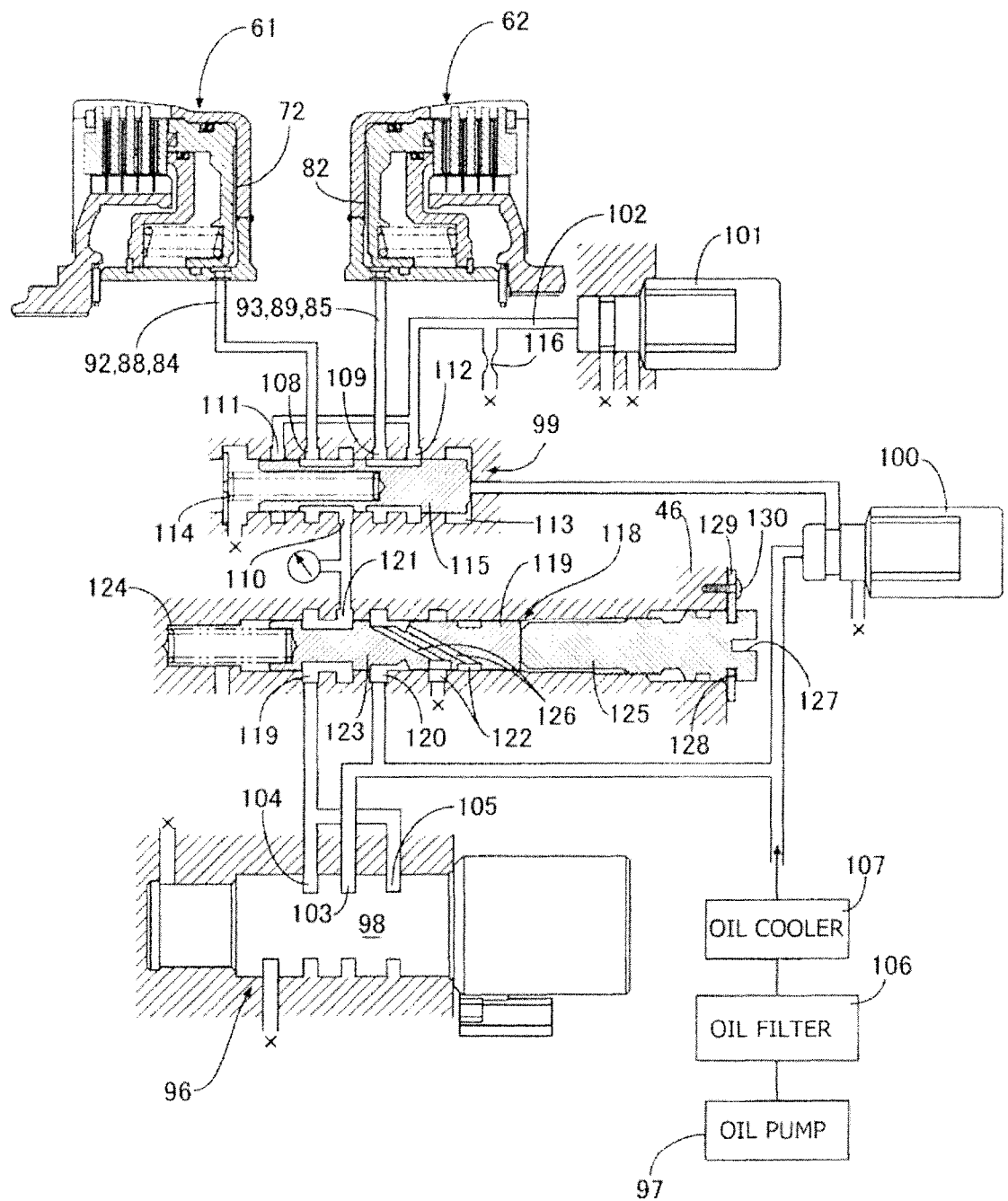
FIG. 6 is a circuit diagram showing a constitution of the clutch actuator.

In FIG. 6, a clutch actuator 96 switches between connection and disconnection of the first hydraulic clutch 61 and the second hydraulic clutch 62. The clutch actuator 96 includes a linear solenoid valve 98 as a hydraulic control solenoid valve for controlling the pressure of a hydraulic oil from an oil pump 97 disposed in a lower portion within the oil storage tank 47. The clutch actuator 96 also includes a single switching valve 99 for alternatively selecting the first and second hydraulic chambers 72 and 82 of the first and second hydraulic clutches 61 and 62 to be supplied with the hydraulic oil from the linear solenoid valve 98. The clutch actuator 96 further includes a shift solenoid valve 100 for controlling the operation of the switching valve 99. The clutch actuator 96 also includes a discharge control solenoid valve 101 for opening and closing a discharge oil passage 102 alternatively selected to be connected to the first and second hydraulic chambers 72 and 82 of the first and second hydraulic clutches 61 and 62.

The linear solenoid valve 98 includes an input port 103, an output port 104, and a feedback port 105 communicating with the output port 104. The linear solenoid valve 98 controls the pressure of the input port 103 to which the hydraulic oil is input to a pressure corresponding to a supplied current, and outputs the hydraulic oil from the output port 104. The input port 103 is supplied with the hydraulic oil from the oil pump 97 via an oil filter 106 and an oil cooler 107.

In addition, the switching valve 99 includes a first output port 108 connected to the first hydraulic chamber 72 of the first hydraulic clutch 61 via the first oil chamber 92, the first axial oil passage 88, and the first oil passage 84. The switching valve 99 also includes a second output port 109 connected to the second hydraulic chamber 82 of the second hydraulic clutch 62 via the second oil chamber 93, the second axial oil passage 89, and the second oil passage 85. The switching valve 99 further includes an input port 110 supplied with the hydraulic oil from the linear solenoid valve 98. The switching valve 99 also includes a first discharge port 111 and a second discharge port 112 communicating with the common discharge oil passage 102. The switching valve 99 further includes a spool valve element 115 disposed so as to have one end faced to a pilot chamber 113 and have another end on which the spring force of a return spring 114 acts.

The shift solenoid valve 100 switches between a state of allowing the oil pressure of the hydraulic oil supplied from the oil pump 97 via the oil filter 106 and the oil cooler 107 to act on the pilot chamber 113 and a state of releasing the pressure of the pilot chamber 113. In the state in which the oil pressure of the pilot chamber 113 is released, the spool valve element 115 is in such a position as to connect the input port 110 to the first output port 108 and connect the second output port 109 to the second discharge port 112. When an oil pressure acts on the pilot chamber 113, the spool valve element 115 moves to a position to connect the input port 110 to the second output port 109 and connect the first output port 108 to the first discharge port 111.

An orifice 116 is connected to the discharge oil passage 102. The discharge control solenoid valve 101 can be switched between a state of allowing the hydraulic oil in the discharge oil passage 102 to escape to the outside via the orifice 116 and a state of allowing the hydraulic oil in the discharge oil passage 102 to escape to the outside via the discharge control solenoid valve 101.

A manual switching valve 118 that can guide the hydraulic oil from the oil pump 97 to the side of the switching valve 99 by bypassing the linear solenoid valve 98 is provided in an oil passage between the linear solenoid valve 98 and the switching valve 99.

The manual switching valve 118 includes a first input port 119 communicating with the output port 104 of the linear solenoid valve 98. The manual switching valve 118 also includes a second input port 120 communicating with the oil pump 97 via the oil filter 106 and the oil cooler 107. The manual switching valve 118 further includes an output port 121 communicating with the input port 110 of the switching valve 99. The manual switching valve 118 also includes an opened port 122 opened to the outside. The manual switching valve 118 further includes a spool valve element 123 movable between a position to connect the first input port 119 to the output port 121 and a position to connect the second input port 120 to the output port 121. The manual switching valve 118 also includes a spring 124 for biasing the spool valve element 123 to the side of the position to connect the second input port 120 to the output port 121. The manual switching valve 118 further includes an operating piston 125 that can press and move the spool valve element 123 to the side of the position to connect the first input port 119 to the output port 121 against the biasing force of the spring 124, the operating piston 125 abutting against the spool valve element 123 from an opposite side from the spring 124. In addition, orifice passages 126 interposed between the second input port 120 and the opened port 122 are provided in the spool valve element 123.

Figure 7:
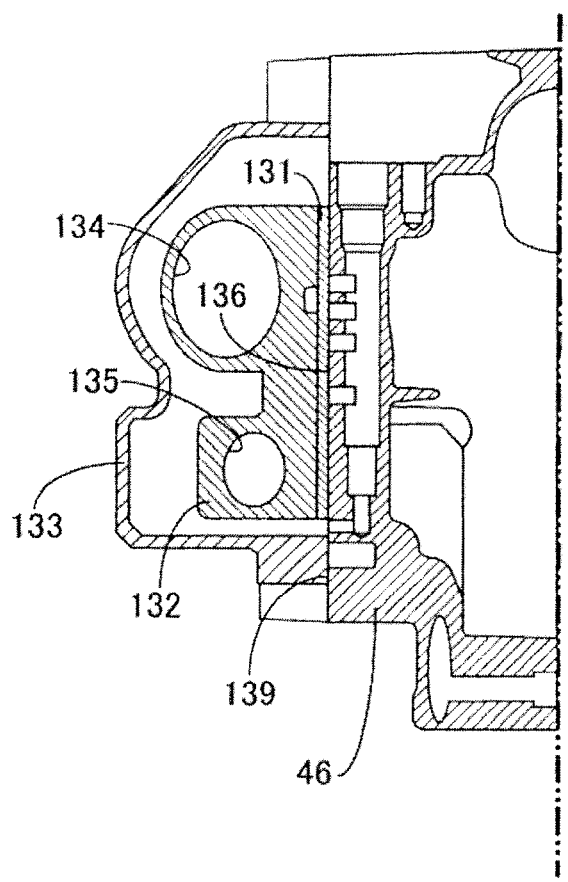
FIG. 7 is a sectional view taken along a line 7-7 of FIG. 3.
Figure 8:
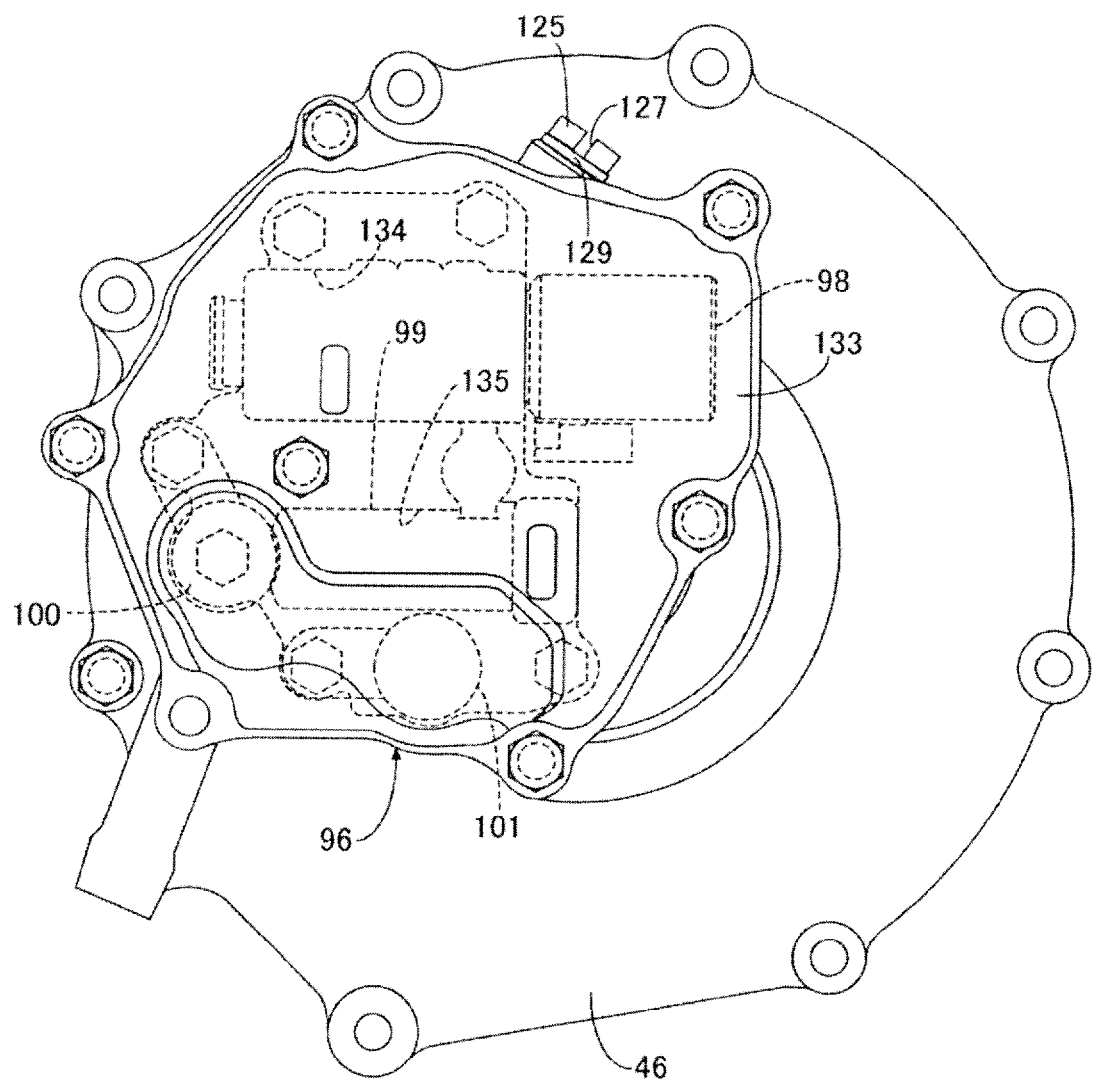
FIG. 8 is a fragmentary enlarged view of FIG. 3.
Figure 9:
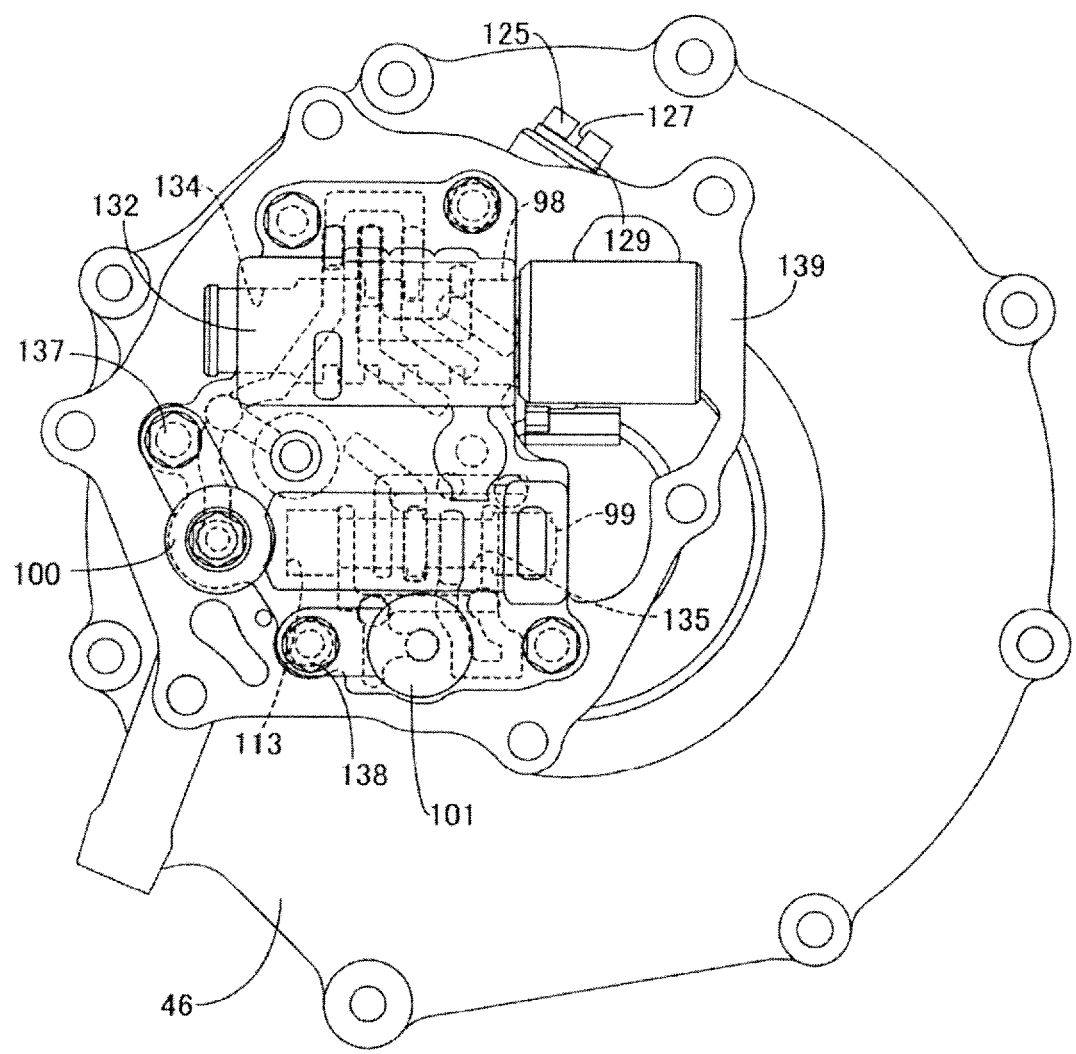
FIG. 9 is a view corresponding to FIG. 8 with a solenoid cover omitted.
Figure 10:
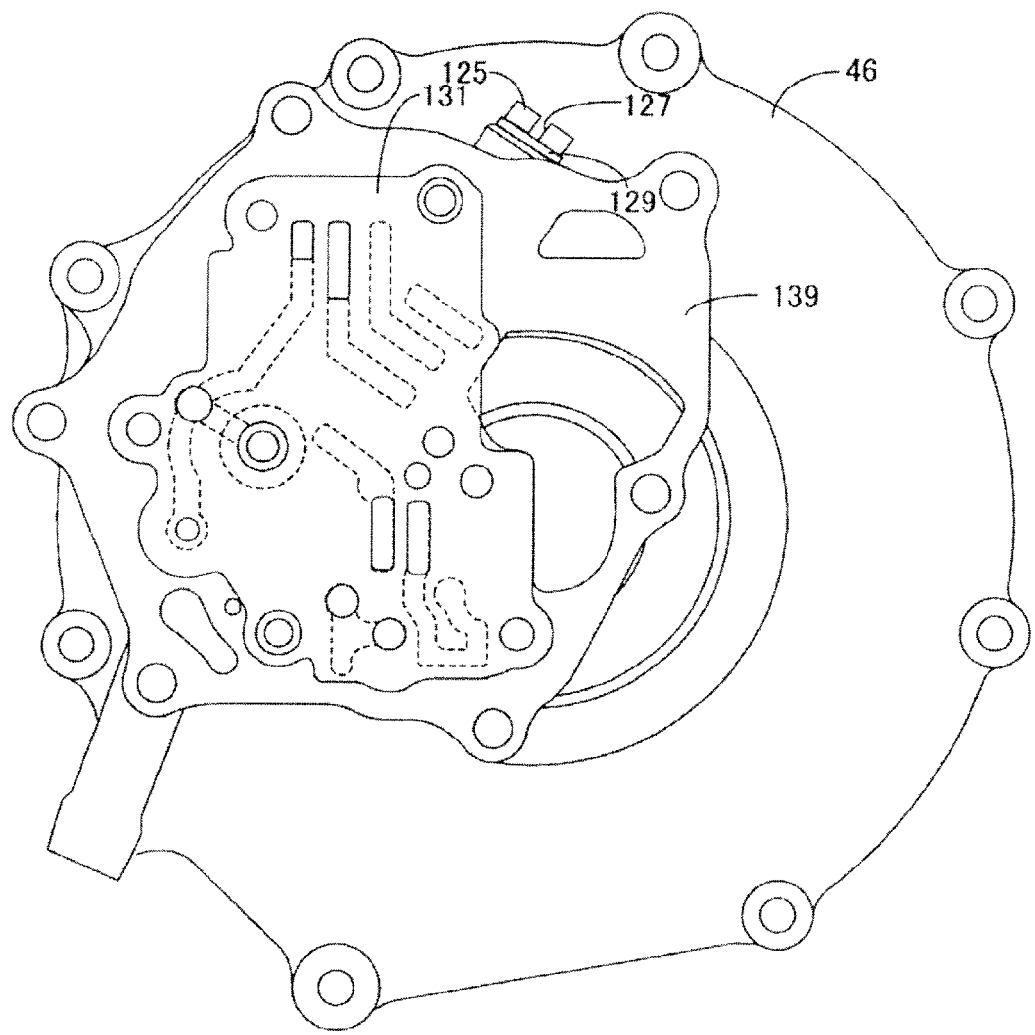
FIG. 10 is a view corresponding to FIG. 8 with the solenoid cover and a solenoid body omitted.
Figure 11:
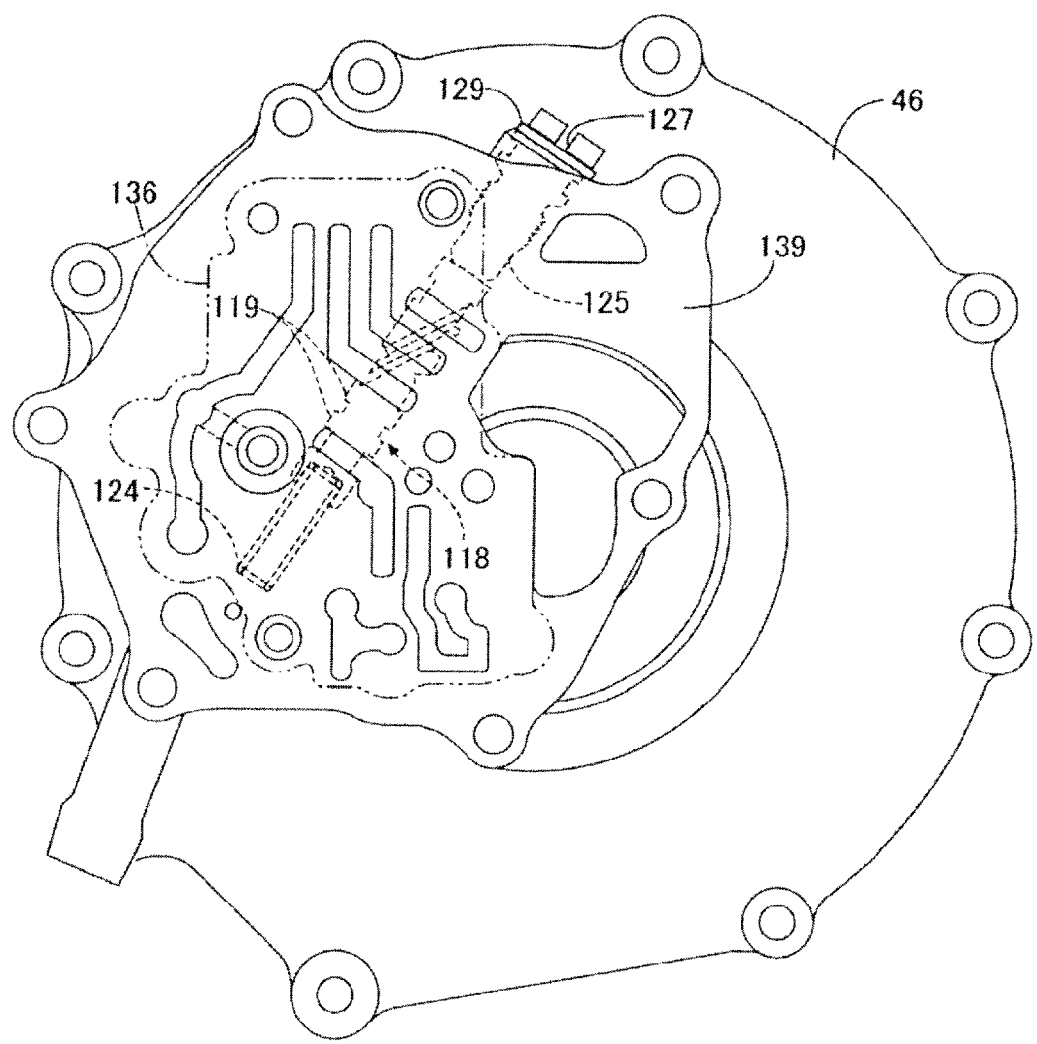
FIG. 11 is a view corresponding to FIG. 8 with the solenoid cover, the solenoid body, and a separator plate omitted.

The clutch actuator 96 is disposed on an outer surface side of the clutch cover 46 while partly overlapping the first hydraulic clutch 61 and the second hydraulic clutch 62 as viewed from the axial direction of the crankshaft 42. In order to dispose such a clutch actuator 96, as shown in FIG. 7, a separate plate 131 and a solenoid body 132 are coupled to the outer surface of the clutch cover 46 so as to be superposed in this order, and a solenoid cover 133 covering the separate plate 131 and the solenoid body 132 is coupled to the outer surface of the clutch cover 46. The manual switching valve 118 is attached to the clutch cover 46 so as to extend in an upward-downward direction, or extend in the upward-downward direction while inclined in a rightward and upward direction in the present embodiment. The operating piston 125 as a manually operated part capable of being manually operated at a time of an emergency such as a failure of the clutch actuator 96 is screwed on the clutch cover 46 so as to be movable back and forth with an outer end portion of the operating piston 125 faced to the outside on the right side of the clutch cover 46. A locking recessed portion 127 to be engaged with a tool to allow rotating operation of the operating piston 125 is formed in the outer end of the operating piston 125.

In addition, an annular recessed portion 128 is formed in the outer circumference of the outer end portion of the operating piston 125. An engaging plate 129 engageable with the annular recessed portion 128 is fastened to the clutch cover 46 by a screw member 130. When the operating piston 125 is moved back and forth by the rotating operation of the operating piston 125, it may be necessary to release the fastening of the engaging plate 129 to the clutch cover 46 and release the engagement of the engaging plate 129 with the annular recessed portion 128.

Referring also to FIGS. 8 to 11, the linear solenoid valve 98, the switching valve 99, the shift solenoid valve 100, and the discharge control solenoid valve 101 are attached to the solenoid body 132.

In the solenoid body 132, a bottomed first attaching hole 134 for attaching the linear solenoid valve 98, and a bottomed second attaching hole 135 for attaching the switching valve 99 are provided in parallel with a horizontal direction such that the second attaching hole 135 is located below the first attaching hole 134.

The solenoid body 132 is attached to a flat solenoid body attaching surface 136 formed on the clutch cover 46 via the separate plate 131. The shift solenoid valve 100 is attached to the solenoid body 132 by a bolt 137 from a direction intersecting the solenoid body attaching surface 136 (direction orthogonal to the solenoid body attaching surface 136 in the present embodiment). In addition, the discharge control solenoid valve 101 is attached to the solenoid body 132 by a bolt 138 so as to be parallel with the shift solenoid valve 100 and adjacent to the switching valve 99 from below.

In addition, the shift solenoid valve 100 is attached to the solenoid body 132 so as to be juxtaposed to the switching valve 99 on the side of the switching valve 99. The linear solenoid valve 98, the switching valve 99 and the shift solenoid valve 100 juxtaposed to the switching valve 99 on the side of the switching valve 99, and the discharge control solenoid valve 101 are arranged from above in this order.

The solenoid body 132 is covered by the solenoid cover 133 together with the shift solenoid valve 100 and the discharge control solenoid valve 101. A flat solenoid cover attaching surface 139 for attaching the solenoid cover 133 is formed on the clutch cover 46 so as to be flush and continuous with the solenoid body attaching surface 136.

Part of the oil passages connecting the linear solenoid valve 98, the switching valve 99, the shift solenoid valve 100, the discharge control solenoid valve 101, the manual switching valve 118, and the oil cooler 107 to each other is formed by a plurality of grooves opened in the solenoid body attaching surface 136 and the separate plate 131 covering part of the grooves.

Figure 12:
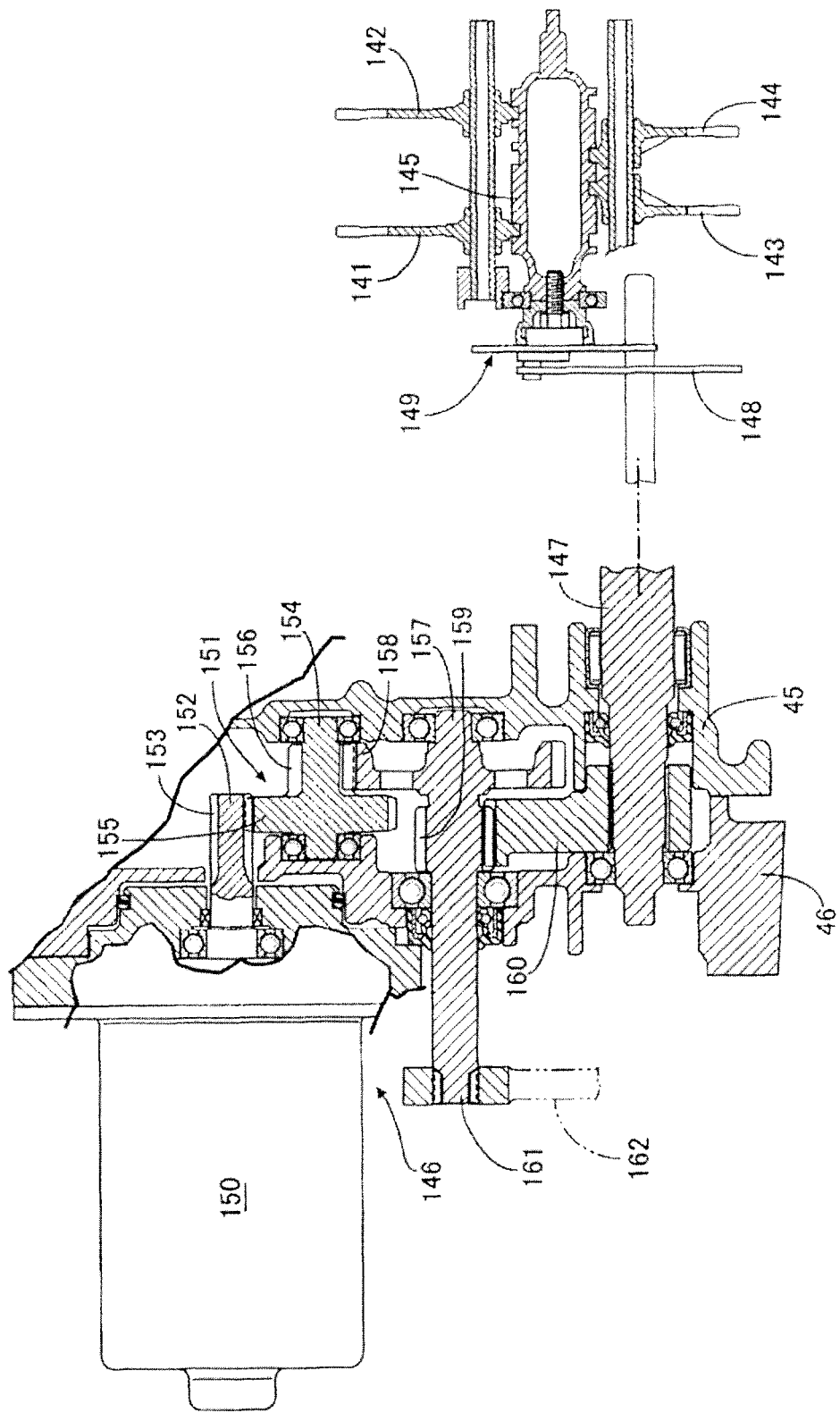
FIG. 12 is a sectional view taken along a line 12-12 of FIG. 3.

In FIG. 12, the transmission M includes a shift drum 145 having an axis parallel with the first main shaft 55 and the second main shaft 56, with a plurality of shift forks, for example four shift forks 141, 142, 143, and 144 engaged with the outer circumference of the shift drum 145. The shift drum 145 is rotation-driven by a speed change actuator 146, whereby the speed change stage of the transmission M is changed.

The speed change actuator 146 is disposed on one side (rear side) of the engine main body 28 together with the clutch actuator 96 in the axial direction of the crankshaft 42. The speed change actuator 146 includes a shift spindle 147 rotatably supported by the spacer plate 45 and the clutch cover 46. The speed change actuator 146 also includes a shift arm 148 having a base end portion fixed to the shift drum 145. The speed change actuator 146 further includes a pawl ratchet mechanism 149 provided between the shift arm 148 and the shift drum 145 so as to intermittently drive the shift drum 145 by a predetermined angle according to rotation by a predetermined angle of the shift spindle 147 and the shift arm 148. The speed change actuator 146 also includes an electric motor 150 having an axis of rotation parallel with the shift drum 145 and attached to the clutch cover 46. The speed change actuator 146 further includes a reduction gear mechanism 151 provided between the electric motor 150 and the shift spindle 147.

The reduction gear mechanism 151 includes a driving pinion 153 provided to an output shaft 152 of the electric motor 150. The reduction gear mechanism 151 also includes a first intermediate gear 155 formed integrally with a first gear shaft 154 having both end portions rotatably supported by the spacer plate 45 and the clutch cover 46, the first intermediate gear 155 being meshed with the driving pinion 153. The reduction gear mechanism 151 further includes a second intermediate gear 156 fixed to the first gear shaft 154. The reduction gear mechanism 151 also includes a third intermediate gear 158 formed integrally with a second gear shaft 157 rotatably supported by the spacer plate 45 and the clutch cover 46 so as to have one end portion projecting airtightly to the outside of the clutch cover 46, the third intermediate gear 158 being meshed with the second intermediate gear 156. The reduction gear mechanism 151 further includes a fourth intermediate gear 159 formed integrally with the second gear shaft 157. The reduction gear mechanism 151 also includes a driven sector gear 160 fixed to the shift spindle 147 and meshed with the fourth intermediate gear 159.

The speed change actuator 146 is provided with a manual speed change operating part 161 capable of being manually operated at a time of an emergency such as a failure of the electric motor 150 or battery exhaustion. This manual speed change operating part 161 is provided so as to allow a bar-shaped tool 162 to be hooked onto an outer end of the second gear shaft 157 forming part of the reduction gear mechanism 151.

The speed change actuator 146 and the clutch actuator 96 are disposed on the engine main body 28 on the right side of the cylinder axis C such that the speed change actuator 146 is disposed on the outside of the clutch actuator 96. The operating piston 125 of the clutch actuator 96 is disposed so as to be oriented to the side of the speed change actuator 146.

In addition, a space S to which the manual speed change operating part 161 is faced is formed between the clutch actuator 96 and the speed change actuator 146 so as to allow operation of the tool 162 necessary to change the speed change stage of the transmission M by one stage.

As shown in FIG. 1, at least part of the engine main body 28, or the rear portion of the engine main body 28 in certain embodiments, is disposed below the rear-row occupant footrest floor 20. A lid member 20a allowing the manual speed change operating part 161 and the operating piston 125 to be manually operated by opening part of the rear-row occupant footrest floor 20 is attached to the floor 20 so as to be able to be opened and closed.

Again in FIG. 3, the transmission M is disposed below the inclined cylinder axis C of the engine main body 28 while partly overlapping the first hydraulic clutch 61 and the second hydraulic clutch 62, as viewed from the axial direction of the crankshaft 42. The speed change actuator 146 is disposed in a position such that the transmission M is interposed between the speed change actuator 146 and the crankshaft 42. A pair of exhaust pipes 164 connected to a lower side wall of the cylinder head 30 of the engine main body 28 is extended so as to pass above the transmission M and partly overlap an upper portion of the speed change actuator 146, as viewed from the axial direction of the crankshaft 42. These exhaust pipes 164 are connected to an exhaust muffler 165 (see FIG. 2) that is disposed so as to extend in the vehicle width direction along the rear end of the vehicle body frame F and which is supported by the vehicle body frame F.

In addition, the speed change actuator 146 is disposed on the outside on an opposite side of the driving gear group 51 in the transmission M from the crankshaft 42.

The oil storage tank 47 is attached to the spacer plate 45 of the engine main body 28 so as to be located outward in the axial direction of the crankshaft 42 on the periphery of the clutch actuator 96. The oil filter 106 is disposed in the oil storage tank 47 on an opposite side from the transmission M and the clutch actuator 96 with respect to the crankshaft 42 such that a horizontal line L passing through the axis of the crankshaft 42 crosses the oil filter 106. In addition, the oil cooler 107 is disposed on an upper portion of the oil storage tank 47.

Next, describing the action of certain embodiments, the solenoid body 132 is attached to the outer surface side of the clutch cover 46 attached to the spacer plate 45 of the engine main body 28 so as to cover the first hydraulic clutch 61 and the second hydraulic clutch 62. The linear solenoid valve 98 for controlling the pressure of the hydraulic oil from the oil pump 97, the single switching valve 99 for alternatively selecting the first and second hydraulic chambers 72 and 82 of the pair of the first and second hydraulic clutches 61 and 62 to be supplied with the hydraulic oil from the linear solenoid valve 98, and the shift solenoid valve 100 for controlling the operation of the switching valve 99 are attached to the solenoid body 132. Thus, outlets for the hydraulic oil from the solenoid body 132 to the side of the hydraulic chambers 72 and 82 of both of the hydraulic clutches 61 and 62 can be disposed closer to the centers of both of the hydraulic clutches 61 and 62. It is therefore possible to reduce effects of the outside air temperature and enhance responsiveness by performing the hydraulic control of the hydraulic clutches 61 and 62 at a position close to the hydraulic clutches 61 and 62.

In addition, the shift solenoid valve 100 is attached to the solenoid body 132 attached to the solenoid body attaching surface 136 formed on the clutch cover 46 from a direction intersecting the solenoid body attaching surface 136. The solenoid cover 133 attached to the clutch cover 46 covers the solenoid body 132 together with the shift solenoid valve 100. Thus, a space occupied by the shift solenoid valve 100 in a plane orthogonal to the axis of the hydraulic clutches 61 and 62 can be reduced, and the solenoid cover 133 covering the solenoid body 132 together with the shift solenoid valve 100 can be miniaturized. Furthermore, covering the shift solenoid valve 100 and the solenoid body 132 with the solenoid cover 133 can provide protection and thermal insulation from an outside air. It is therefore possible to reduce the effects of the outside air temperature more effectively and further enhance the responsiveness.

In addition, the solenoid cover attaching surface 139 for attaching the solenoid cover 133 is formed on the clutch cover 46 so as to be flush and continuous with the solenoid body attaching surface 136. Thus, the mold shape of the clutch cover 46 is simplified, and the processing of the clutch cover 46 is facilitated. Therefore, productivity can be improved.

In addition, the discharge control solenoid valve 101 for opening and closing the discharge oil passage 102 that allows the hydraulic oil from the pair of hydraulic clutches 61 and 62 to escape is attached to the solenoid body 132 so as to be parallel with the shift solenoid valve 100 and adjacent to the switching valve 99. Thus, switching between connection and disconnection of the pair of hydraulic clutches 61 and 62 can be performed smoothly by controlling the release of the oil pressure from the hydraulic clutches 61 and 62 by the discharge control solenoid valve 101, while the discharge control solenoid valve 101 is easily covered by the solenoid cover 133.

In addition, the linear solenoid valve 98, the switching valve 99 and the shift solenoid valve 100 juxtaposed to the switching valve 99 on the side of the switching valve 99, and the discharge control solenoid valve 101 are arranged from above in this order. Thus, the hydraulic oil from the linear solenoid valve 98 flows downward from above. The hydraulic oil can therefore be made to flow smoothly. In addition, passage resistance is reduced, so that an oil passage structure can be miniaturized.

In addition, the manual switching valve 118 extending in the upward-downward direction which manual switching valve 118 can guide the hydraulic oil from the oil pump 97 to the side of the switching valve 99 by bypassing the linear solenoid valve 98 is provided in the oil passage between the linear solenoid valve 98 and the switching valve 99. Thus, the hydraulic oil from the oil pump 97 can be forcedly supplied to one of the hydraulic chambers 72 and 82 of the two hydraulic clutches 61 and 62, while the flowing direction of the hydraulic oil at the time of forcedly supplying the hydraulic oil is the same as in a non-operating state of the manual switching valve 118. Therefore, the hydraulic oil is made to flow smoothly, and the oil passage structure can be miniaturized.

In addition, the manual switching valve 118 is disposed in the clutch cover 46. It is thus possible to shorten the oil passages and simplify the structure of the solenoid body 132 while controlling the oil pressure of the hydraulic clutches 61 and 62 with a two-story structure of the clutch cover 46 and the solenoid body 132 attached to the clutch cover 46.

In addition, the clutch actuator 96 for switching between connection and disconnection of the first hydraulic clutch 61 and the second hydraulic clutch 62 and the speed change actuator 146 for switching the speed change stage of the transmission M are arranged so as to be adjacent to one side of the engine main body 28 along the axis of the crankshaft 42. The clutch actuator 96 is provided with the manual clutch operating part 125 capable of being manually operated. The speed change actuator 146 is provided with the manual speed change operating part 161 capable of being manually operated. Thus, at a time of an emergency, in both of the clutch actuator 96 and the speed change actuator 146, the manual clutch operating part 125 and the manual speed change operating part 161 disposed in proximity to each other can be operated to successively perform clutch connection switching necessary for travelling and the switching of the speed change stage. Therefore, operability can be improved.

In addition, the manual speed change operating part 161 of the speed change actuator 146 including the reduction gear mechanism 151 is provided so as to allow the tool 162 to be hooked onto the second gear shaft 157 forming part of the reduction gear mechanism 151. Thus, the manual speed change operating part 161 is formed by changing the shape of the second gear shaft 157, and the number of parts can be reduced by sharing the functions of parts, which sharing eliminates a need to add new parts.

In addition, the manual clutch operating part of the clutch actuator 96 including the manual switching valve 118 is the operating piston 125 forming part of the manual switching valve 118 and oriented to the side of the speed change actuator 146. Thus, the operability of the manual speed change operating part 161 and the operating piston 125 as the manual clutch operating part can be further improved.

In addition, the space S to which the manual speed change operating part 161 is faced is formed between the clutch actuator 96 and the speed change actuator 146 so as to allow operation of the tool 162 necessary to change the speed change stage of the transmission M by one stage. Thus, the speed change stage can be changed by one stage without a need for special operation of the manual speed change operating part 161, while the space S between the clutch actuator 96 and the speed change actuator 146 is prevented from becoming larger than necessary.

In addition, the rear portion of the engine main body 28 as at least part of the engine main body 28 is disposed below the rear-row occupant footrest floor 20, so that the manual speed change operating part 161 and the operating piston 125 can be manually operated by opening part of the rear-row occupant footrest floor 20 of the four-wheeled vehicle. It is thus possible to improve usability at a time of an emergency while achieving a lower center of gravity.

In addition, the transmission M partly overlapping the first hydraulic clutch 61 and the second hydraulic clutch 62 as viewed from the axial direction of the crankshaft 42 in the internal combustion engine E is disposed below the inclined cylinder axis C of the engine main body 28, and the speed change actuator 146 is disposed in a position such that the transmission M is interposed between the speed change actuator 146 and the crankshaft 42. The exhaust pipes 164 connected to the lower side wall of the cylinder head 30 are extended so as to pass above the transmission M and partly overlap an upper portion of the speed change actuator 146 as viewed from the axial direction of the crankshaft 42. Thus, the clutch actuator 96 and the speed change actuator 146 can be disposed at a position equal to that of the crankshaft 42 to be prevented from being affected by submergence. In addition, a space for disposing the exhaust pipes 164 connected to the lower side wall of the cylinder head 30 can be secured.

In addition, the transmission M is a gear transmission including the driving gear group 51 and the driven gear group 52 on the upper side and the lower side. The axis of rotation of the driving gear group 51 disposed on the upper side of the driving gear group 51 and the driven gear group 52 is disposed at the same height as the axis of the crankshaft 42. The speed change actuator 146 is disposed on the outside on the opposite side of the driving gear group 51 from the crankshaft 42. The output shaft 53 is disposed below the driven gear group 52 disposed on the lower side of the driving gear group 51 and the driven gear group 52. Thus, a space for disposing the output shaft 53 can be secured easily, and the power unit P can be made more compact.

In addition, the oil storage tank 47 located outward in the axial direction of the crankshaft 42 on the periphery of the clutch actuator 96 is attached to the engine main body 28. Thus, an oil can be stored and retained at a relatively high position. This, coupled with the arrangement of the clutch actuator 96 and the speed change actuator 146 at a relatively high position, makes it possible to reduce a downward bulge of the power unit P, and thus increase a ground clearance of the vehicle.

In addition, the oil filter 106 is disposed in the oil storage tank 47 on the opposite side from the transmission M and the clutch actuator 96 with respect to the crankshaft 42 such that the horizontal line L passing through the axis of the crankshaft 42 crosses the oil filter 106. Thus, the power unit P can be miniaturized, while the oil filter 106 is prevented from being affected by submergence.

In addition, the oil cooler 107 is disposed on the upper portion of the oil storage tank 47. Thus, the power unit P can be miniaturized while maintainability is improved by disposing accessories on one side along the axis of the crankshaft 42 in a concentrated manner.

In addition, the generator cover 48 and the reduction mechanism cover 49 are attached to the engine main body 28 on the opposite side from the oil storage tank 47 in the direction along the axis of the crankshaft 42. Thus, bulges from the engine main body 28 are balanced on both sides of the crankshaft 42, so that mountability in the vehicle can be improved.

Certain embodiments of the present invention have been described above. However, the present invention is not limited to the foregoing embodiments, but various design changes can be made without departing from the present invention described in the claims.

DESCRIPTION OF REFERENCE SYMBOLS

28 . . . Engine main body
42 . . . Crankshaft
61, 62 . . . Hydraulic clutch
96 . . . Clutch actuator
118 . . . Manual switching valve
125 . . . Operating piston as manual clutch operating part
146 . . . Speed change actuator
151 . . . Reduction gear mechanism
157 . . . Gear shaft
161 . . . Manual speed change operating part
162 . . . Tool
E . . . Internal combustion engine
M . . . Transmission
P . . . Power unit
S . . . Space
WF . . . Front wheel as driving wheel
WR . . . Rear wheel as driving wheel

We claim:

1. A power unit, comprising:
a clutch actuator configured to switch between connection and disconnection of a hydraulic clutch disposed midway in a power transmission system between a crankshaft of an internal combustion engine and a driving wheel and a speed change actuator configured to switch a speed change stage of a transmission disposed midway in the power transmission system,
wherein the clutch actuator and the speed change actuator are disposed so as to be adjacent to each other on one side of an engine main body along an axis of the crankshaft,
wherein the clutch actuator comprises a manual clutch operating part configured to be manually operated, and
wherein the speed change actuator comprises a manual speed change operating part configured to be manually operated.

2. The power unit according to claim 1,
wherein the manual speed change operating part of the speed change actuator comprises a reduction gear mechanism configured to allow a tool to be hooked onto a gear shaft forming part of the reduction gear mechanism.

3. The power unit according to claim 2,
wherein a space to which the manual speed change operating part is faced is formed between the clutch actuator and the speed change actuator so as to allow operation of the tool necessary to change the speed change stage of the transmission by one stage.

4. The power unit according to claim 1,
wherein the manual clutch operating part of the clutch actuator comprises a manual switching valve, and
wherein the manual switching valve is an operating piston forming part of the manual switching valve, and is oriented to a side of the speed change actuator.

5. A four-wheeled vehicle mounted with the power unit according to claim 4, the four-wheeled vehicle comprising a rear-row occupant footrest floor,
wherein at least part of the engine main body is disposed below the rear-row occupant footrest floor, and
wherein the manual speed change operating part and the manual clutch operating part are configured to be manually operated by an opening part of the rear-row occupant footrest floor.

6. A power unit, comprising:
a clutch actuator means for switching between connection and disconnection of a hydraulic clutch means disposed midway in a power transmission system means between a crankshaft of an internal combustion engine means and a driving wheel means and a speed change actuator means for switching a speed change stage of a transmission disposed midway in the power transmission system means,
wherein the clutch actuator means and the speed change actuator means are disposed so as to be adjacent to each other on one side of an engine main body along an axis of the crankshaft,
wherein the clutch actuator means comprises a manual clutch operating part configured to be manually operated, and
wherein the speed change actuator means comprises a manual speed change operating part configured to be manually operated.

7. The power unit according to claim 6,
wherein the manual speed change operating part of the speed change actuator means comprises a reduction gear mechanism configured to allow a tool to be hooked onto a gear shaft forming part of the reduction gear mechanism.

8. The power unit according to claim 7,
wherein a space to which the manual speed change operating part is faced is formed between the clutch actuator means and the speed change actuator means so as to allow operation of the tool necessary to change the speed change stage of the transmission means by one stage.

9. The power unit according to claim 6,
wherein the manual clutch operating part of the clutch actuator comprises a manual switching valve, and
wherein the manual switching valve is an operating piston forming part of the manual switching valve, and is oriented to a side of the speed change actuator means.

10. A four-wheeled vehicle mounted with the power unit according to claim 9, the four-wheeled vehicle comprising a rear-row occupant footrest floor,
wherein at least part of the engine main body is disposed below the rear-row occupant footrest floor, and
wherein the manual speed change operating part and the manual clutch operating part are configured to be manually operated by an opening part of the rear-row occupant footrest floor.

11. A power unit, comprising:
a clutch actuator;
a hydraulic clutch;
a power transmission system comprising a transmission;
an internal combustion engine comprising a crankshaft, the internal combustion engine configured to generate motive power for rotating a driving wheel; and
a speed change actuator configured to switch a speed change stage of the transmission,
wherein the clutch actuator is configured to switch between connection and disconnection of the hydraulic clutch, wherein the hydraulic clutch is disposed midway in the power transmission system between the crankshaft of the internal combustion engine and the driving wheel, wherein the transmission is disposed midway in the power transmission system, wherein the clutch actuator and the speed change actuator are disposed so as to be adjacent to each other on one side of an engine main body along an axis of the crankshaft, wherein the clutch actuator comprises a manual clutch operating part configured to be manually operated, and wherein the speed change actuator comprises a manual speed change operating part configured to be manually operated.

12. The power unit according to claim 11, wherein the manual speed change operating part of the speed change actuator comprises a reduction gear mechanism configured to allow a tool to be hooked onto a gear shaft forming part of the reduction gear mechanism.

13. The power unit according to claim 12, wherein a space to which the manual speed change operating part is faced is formed between the clutch actuator and the speed change actuator so as to allow operation of the tool necessary to change the speed change stage of the transmission by one stage.

14. The power unit according to claim 11, wherein the manual clutch operating part of the clutch actuator comprises a manual switching valve, and wherein the manual switching valve is an operating piston forming part of the manual switching valve, and is oriented to a side of the speed change actuator.

15. A four-wheeled vehicle mounted with the power unit according to claim 14, the four-wheeled vehicle comprising a rear-row occupant footrest floor, wherein at least part of the engine main body is disposed below the rear-row occupant footrest floor, and wherein the manual speed change operating part and the manual clutch operating part are configured to be manually operated by an opening part of the rear-row occupant footrest floor.

16. A power unit, comprising:

hydraulic clutch means for engaging and disengaging driving gears;

clutch actuator means for switching between connection and disconnection of the hydraulic clutch means;

internal combustion engine means for generating motive power for rotating a driving wheel, the internal combustion engine means comprising a crankshaft;

a power transmission system means for transmitting rotational driving force of the internal combustion engine means, the power transmission system means comprising transmission means; and a speed change actuator means for switching a speed change stage of the transmission means, wherein the hydraulic clutch means is disposed midway in the power transmission system between the crankshaft of the internal combustion engine means and the driving wheel, wherein the transmission means is disposed midway in the power transmission system, wherein the clutch actuator means and the speed change actuator means are disposed so as to be adjacent to each other on one side of an engine main body along an axis of the crankshaft, wherein the clutch actuator means comprises a manual clutch operating part configured to be manually operated, and wherein the speed change actuator means comprises a manual speed change operating part configured to be manually operated.

17. The power unit according to claim 16, wherein the manual speed change operating part of the speed change actuator means comprises a reduction gear mechanism configured to allow a tool to be hooked onto a gear shaft forming part of the reduction gear mechanism.

18. The power unit according to claim 17, wherein a space to which the manual speed change operating part is faced is formed between the clutch actuator means and the speed change actuator means so as to allow operation of the tool necessary to change the speed change stage of the transmission means by one stage.

19. The power unit according to claim 16, wherein the manual clutch operating part of the clutch actuator comprises a manual switching valve, and wherein the manual switching valve is an operating piston forming part of the manual switching valve, and is oriented to a side of the speed change actuator means.

20. A four-wheeled vehicle mounted with the power unit according to claim 19, the four-wheeled vehicle comprising a rear-row occupant footrest floor, wherein at least part of the engine main body is disposed below the rear-row occupant footrest floor, and wherein the manual speed change operating part and the manual clutch operating part are configured to be manually operated by an opening part of the rear-row occupant footrest floor.

* * * * *